United States Patent [19]
Allen

[11] Patent Number: 6,044,172
[45] Date of Patent: Mar. 28, 2000

[54] METHOD AND APPARATUS FOR REVERSIBLE COLOR CONVERSION

[75] Inventor: James D. Allen, Uthai Thani, Thailand

[73] Assignees: Ricoh Company Ltd., Tokyo, Japan; Ricoh Corporation, West Caldwell, N.J.

[21] Appl. No.: 08/996,359

[22] Filed: Dec. 22, 1997

[51] Int. Cl.[7] .............................. G06K 9/00; G03F 3/08
[52] U.S. Cl. ......................... 382/166; 382/167; 358/523
[58] Field of Search .................................. 382/276, 277, 382/302, 162, 166, 167, 232, 248–253; 358/523, 520, 539

[56] References Cited

U.S. PATENT DOCUMENTS

| | | | |
|---|---|---|---|
| 3,580,655 | 5/1971 | Leith et al. | 359/28 |
| 3,950,103 | 4/1976 | Schmidt-Weinmar | 356/345 |
| 4,136,954 | 1/1979 | Jamieson | 356/349 |
| 4,155,097 | 5/1979 | Lux | 348/420 |

(List continued on next page.)

FOREIGN PATENT DOCUMENTS

| | | |
|---|---|---|
| 0510933 | 10/1992 | European Pat. Off. . |
| 0622741 | 3/1994 | European Pat. Off. . |
| 0593013 | 4/1994 | European Pat. Off. . |
| 0611051 | 8/1994 | European Pat. Off. . |
| 4002298 | 1/1990 | Germany . |
| 2211691 | 5/1989 | United Kingdom . |
| 2285374 | 5/1995 | United Kingdom . |
| 8810049 | 12/1988 | WIPO . |
| 9103902 | 3/1991 | WIPO . |
| 9118361 | 11/1991 | WIPO . |
| 9310634 | 5/1993 | WIPO . |
| 9417492 | 8/1994 | WIPO . |
| 9423385 | 10/1994 | WIPO . |
| 9519683 | 7/1995 | WIPO . |
| 9609718 | 3/1996 | WIPO . |

OTHER PUBLICATIONS

IBM Corporation, "Integrated YUV to Red Green Blue Conversion", 1994, pp. 275–278.

Kari Saarinen, "Comparison of Decimation and Interpolation Methods in Case of Multiple Repeated RGBYCbCr Image Format Conversions", Mar. 5, 1994, pp. 269–272.

Real–Time Imaging, "A New ASIC for Real–Time Linear Color Space", 1995, pp. 373–379.

"Encoding Parameters Of Digital Television For Studios", 1986, pp. 127–136 and 1–2.

Amdahl Corp.'s; "Amdahl Lifts The Veil On It's Enterprise Solutions Concept Of Co–Operative Computing"; May 24, 1991; Pertinent Pages 1.

Midrange Systems; "Optical archiving"; Sep. 16, 1994; Pertinent Pages P42 (1).

Antonini, et al., "Imaging Coding using Wavelet Transform", IEEE Transactions on Image Processing, vol. 1, No. 2, Apr. 1992, pp. 205–220.

Komatsu, et al., "Reversible Subband Coding of Images", pp. 429–436 (Japanese).

Langdon, Jr., Glen G., "Sunset: A Hardware–Oriented Algorithm for Lossless Compression of Gray Scale Images", SPIE vol. 1444, Image Capture, Formatting and Display, 1991, pp. 272–282.

Sweldens, "The Lifting Scheme: A Custom–Design Construction of Biorthogonal Wavelets", Nov. 1995, pp. 1–29.

Howard, et al., "Fast and Efficient Lossless Image Compression", IEEE, 1993, pp. 351–360.

Matsumura, "Wavelet Image Coding Using Block Adaptive Vector Quantization", ECCTD '95 European Conference on Circuit Theory & Design, 1995, pp. 243–246.

(List continued on next page.)

*Primary Examiner*—Madeleine Nguyen
*Attorney, Agent, or Firm*—Blakely, Sokoloff, Taylor & Zafman LLP

[57] ABSTRACT

A method and apparatus for performing color conversion on image data provided as a plurality of vectors representing a datum of the image. The present invention provides a forward transform that performs reversible color conversion on the plurality of vectors, such that the transform is reversible in integer arithmetic with predictable precision.

32 Claims, 5 Drawing Sheets

U.S. PATENT DOCUMENTS

| | | | |
|---|---|---|---|
| 4,190,861 | 2/1980 | Lux | 348/420 |
| 4,223,354 | 9/1980 | Noble et al. | 348/774 |
| 4,393,456 | 7/1983 | Marshall, Jr. | 708/316 |
| 4,510,578 | 4/1985 | Miyaguchi et al. | 364/725 |
| 4,569,075 | 2/1986 | Nassbaumer | 704/203 |
| 4,599,567 | 7/1986 | Goupillaud et al. | 324/76 |
| 4,652,881 | 3/1987 | Lewis | 342/160 |
| 4,663,660 | 5/1987 | Fedele et al. | 348/397 |
| 4,674,125 | 6/1987 | Carlson et al. | 382/303 |
| 4,701,006 | 10/1987 | Perlmutter | 359/9 |
| 4,760,563 | 7/1988 | Beylkin | 367/73 |
| 4,785,348 | 11/1988 | Fonsalas et al. | 348/425 |
| 4,785,349 | 11/1988 | Keith et al. | 348/390 |
| 4,799,179 | 1/1989 | Masson et al. | 708/313 |
| 4,805,129 | 2/1989 | David | 708/300 |
| 4,815,023 | 3/1989 | Arbeiter | 708/301 |
| 4,817,182 | 3/1989 | Adelson et al. | 382/248 |
| 4,821,223 | 4/1989 | David | 708/308 |
| 4,827,336 | 5/1989 | Acampora | 348/396 |
| 4,829,378 | 5/1989 | Legall | 348/398 |
| 4,837,517 | 6/1989 | Barber | 324/339 |
| 4,839,889 | 6/1989 | Gockler | 370/210 |
| 4,858,017 | 8/1989 | Torbey | 358/426 |
| 4,864,398 | 9/1989 | Avis et al. | 348/443 |
| 4,868,868 | 9/1989 | Yazu et al. | 704/205 |
| 4,894,713 | 1/1990 | Delogne et al. | 348/403 |
| 4,897,717 | 1/1990 | Hamilton et al. | 348/404 |
| 4,904,073 | 2/1990 | Lawton et al. | 359/851 |
| 4,918,524 | 4/1990 | Ansari et al. | 348/398 |
| 4,922,544 | 5/1990 | Stansfeld et al. | 382/166 |
| 4,929,223 | 5/1990 | Walsh | 493/56 |
| 4,936,665 | 6/1990 | Whitney | 359/896 |
| 4,974,187 | 11/1990 | Lawton | 708/420 |
| 4,982,283 | 1/1991 | Acampora | 348/410 |
| 4,985,927 | 1/1991 | Norwood et al. | 382/149 |
| 4,987,480 | 1/1991 | Lippman et al. | 348/396 |
| 4,999,705 | 3/1991 | Puri | 348/412 |
| 5,000,183 | 3/1991 | Bonnefous | 600/437 |
| 5,001,764 | 3/1991 | Wood et al. | 382/145 |
| 5,014,134 | 5/1991 | Lawton et al. | 358/266.3 |
| 5,018,210 | 5/1991 | Merryman et al. | 382/145 |
| 5,049,992 | 9/1991 | Citta et al. | 348/443 |
| 5,049,993 | 9/1991 | Legall et al. | 348/448 |
| 5,068,911 | 11/1991 | Resnikoff et al. | 382/240 |
| 5,072,308 | 12/1991 | Lin et al. | 358/426 |
| 5,073,964 | 12/1991 | Resnikoff | 382/277 |
| 5,081,645 | 1/1992 | Resnikoff et al. | 375/210 |
| 5,095,447 | 3/1992 | Manns et al. | 382/144 |
| 5,097,331 | 3/1992 | Chen et al. | 348/398 |
| 5,101,280 | 3/1992 | Moronaga et al. | 358/426 |
| 5,101,446 | 3/1992 | Resnikoff et al. | 382/248 |
| 5,103,306 | 4/1992 | Weiman et al. | 348/400 |
| 5,109,451 | 4/1992 | Aono et al. | 382/166 |
| 5,121,191 | 6/1992 | Cassereau et al. | 348/443 |
| 5,124,930 | 6/1992 | Nicolas et al. | 702/76 |
| 5,128,757 | 7/1992 | Citta et al. | 348/384 |
| 5,128,791 | 7/1992 | Legall et al. | 348/469 |
| 5,148,498 | 9/1992 | Resnikoff et al. | 382/248 |
| 5,152,953 | 10/1992 | Ackermann | 266/252 |
| 5,156,943 | 10/1992 | Whitney | 430/321 |
| 5,173,880 | 12/1992 | Duren et al. | 367/73 |
| 5,182,645 | 1/1993 | Breeuwer et al. | 348/458 |
| 5,235,434 | 8/1993 | Wober | 358/448 |
| 5,241,395 | 8/1993 | Chen | 358/261.3 |
| 5,262,958 | 11/1993 | Chui et al. | 702/75 |
| 5,293,258 | 3/1994 | Dattilo | 358/518 |
| 5,315,670 | 5/1994 | Shapiro | 382/240 |
| 5,321,776 | 6/1994 | Shapiro | 382/240 |
| 5,333,212 | 7/1994 | Ligtenberg | 382/56 |
| 5,335,016 | 8/1994 | Nakagawa | 348/405 |
| 5,343,311 | 8/1994 | Morag et al. | 358/518 |
| 5,347,479 | 9/1994 | Miyazaki | 364/725 |
| 5,381,145 | 1/1995 | Allen et al. | 341/107 |
| 5,384,869 | 1/1995 | Wilkinson et al. | 382/240 |
| 5,412,741 | 5/1995 | Shapiro | 382/232 |
| 5,416,614 | 5/1995 | Crawford | 358/530 |
| 5,420,891 | 5/1995 | Akansu | 375/355 |
| 5,453,945 | 9/1995 | Tucker et al. | 364/725 |
| 5,455,874 | 10/1995 | Ormsby et al. | 382/251 |
| 5,481,308 | 1/1996 | Hartung et al. | 348/398 |
| 5,495,292 | 2/1996 | Zhang et al. | 348/407 |
| 5,497,435 | 3/1996 | Berger | 382/249 |
| 5,523,847 | 6/1996 | Feig et al. | 358/261.3 |
| 5,534,925 | 7/1996 | Zhong | 348/384 |
| 5,537,493 | 7/1996 | Wildinson | 382/240 |
| 5,541,594 | 7/1996 | Huang et al. | 341/51 |
| 5,546,477 | 8/1996 | Knowles et al. | 382/242 |
| 5,563,690 | 10/1996 | Shapiro | 382/239 |
| 5,602,589 | 2/1997 | Vishwanath et al. | 348/398 |
| 5,710,562 | 1/1998 | Gormish et al. | 341/107 |
| 5,731,988 | 3/1998 | Zandi et al. | 364/526 |
| 5,748,786 | 5/1998 | Zandi et al. | 382/240 |
| 5,848,195 | 12/1998 | Romriell | 382/246 |
| 5,880,856 | 3/1999 | Ferriere | 358/432 |

OTHER PUBLICATIONS

Lux, P., "A Novel Set of Closed Othogonal Functions for Picture Code", 1977, pp. 267–274.

Shah, et al., "A Chip Set for Lossless Image Compression", IEEE Journal of Solid–State Circuits, vol. 26, No. 3, Mar. 1991, pp. 237–244.

Marshall, Jr., "U–L Block–Triangular Matrix and Ladder Realizations of Subband Coders", IEEE 1993, pp. 177–180.

Shapiro, J.M., "An Embedded Hierarchical Image Coder Using Zerotrees of Wavelet Coefficients", IEEE, 1993, pp. 214–223.

Villasenor, et al., "Filter Evaluation and Selection in Wavelet Image Compression", IEEE 1994, pp. 351–360.

Amir Said, et al., "Image Compression Using the Spatial–Orientation Tree", IEEE 1993, pp.. 279–282.

Shapiro, "Embedded Image Coding Usigng Zerotrees of Wavelet Coeffiecients", Dec. 1993, pp. 3445–3462.

Reusens, et al., "New Results in Subband/Wavelet Image Coding", May 1993, pp. 381–385.

Marshall, Jr., "Multiresolution Transform Matrices", IEEE 1991, pp. 461–466.

German Search Report, Dated Mar. 21, 1997, 3 pgs.

Kalker, et al., "Ladder Structures for Multidimensional Linear Phase Perfect Reconstruction Filter Banks and Wavelets", SPIE vol. 1818, Visual Communication and Image Processing '92, pp. 12–20.

Woods, Subband Image Coding, 1991, pp. 101–108, 163–167 and 180–189.

Jeon, et al., "A New Technique of Linear Phase QMF Filter Design for Sub–Band Coding", Visual Communications and Image Processing '90, vol. 1360, pp. 860–867.

John W. Woods, "Subband Coding of Images", IEEE Transactions on Acoustics, Speech and Signal Processing, vol. ASSP–34, No. 5, Oct. 1986, pp. 1278–1288.

Irie, et al., "A Study on Perfect Reconstructive Subband Coding", IEEE Transactions on Circuits and Systems for Video Technology, vol. 1, No. 1, Mar. 1991.

Daubechies, et al., "Factoring Wavelet Transforms into Lifting Steps", pp. 1–24, Sep. 1996.

Chao, et al., "An Approach of Fast Integer Reversible Wavelet Transforms for Image Compression", pp. 1–24, no date.

Calderbank, et al., "Wavelet Transforms that Map Integers to Integers", 1991 Mathematics Subject Classification, pp. 1–37, Aug. 1996.

Bruekers, et al., "New Networks for Perfect Inversion and Perfect Reconstruction", IEEE Journal on Selected Areas in Communication, vol. 10, No. 1, pp. 130–137, Jan. 1992.

Padmanabhan, et al., "Feedback–based Orthogonal Digital Filters", IEEE Transactions on Circuits and Systems, Aug. 1993, No. 8, pp. 512–525.

Sweldens, "The Lifting Scheme: A Construction of Second Generation Wavelets", May 1995, pp. 1–33.

Gall, et al., "Sub–Band Coding of Digital Images Using Symmetric Short Kernal Filters and Arithmetic Coding Techniques", 1988 International Conference on Asoustics, Speech and Signal Processing, pp. 761–764.

Dyck, et al., "Ladder Realizations of Fast Subband/VQ Coders with Diamond Support for Color Images", IEEE 1993, pp. 667–670.

Denk, et al., "Architecture for Lattice Structure Based Orthonormal Discrete Wavelet Transforms", IEEE 1994, pp. 259–270.

International Search Report for Application No: GB 9518298.6, Nov. 8, 1995.

Ohta, Wavelet Picture Coding with Transform Coding Approach:, Jul. 1992, pp. 776–784.

French Search Report, 9511024, Nov. 26, 1996.

Said, et al., "Reversible Image Compression Via Multiresolution Representation and Predictive Coding", Aug. 11, 1993, pp. 664–674.

Xiong, et al., "Joint Optimization of Scalar and Tree–Structured Quantization of Wavelet Image Decompressions", Jan. 11, 1993, pp. 891–895.

Szu, et al., Image Wavelet Transforms Implemented by Discrete Wavelet Chips:, Jul. 2, 1994, No. 7, pp. 2310–2325.

French Search Report, FR9511023, Nov. 26, 1996.

Said, et al., "Image Compression Using the Spatial–Orientation Tree", IEEE Mar. 5, 1993, pp. 279–282.

METHOD AND APPARATUS FOR REVERSIBLE COLOR CONVERSION

FIELD OF THE INVENTION

The present invention relates to the field of data compression and decompression systems; particularly, the present invention relates to a method and apparatus for lossless or lossy compression/decompression systems that employ a color space.

BACKGROUND OF THE INVENTION

A color space is a region in a 3-dimensional or higher dimensional vector space. Any basis, such as three linearly independent 3-dimensional vectors, defines a color coordinate system. A commonly used color coordinate system is the R(red), G(green), and B(blue), defined by their center wavelengths. Given one 3-dimensional color coordinate system, other 3-dimensional linear color coordinate systems may be represented by an invertible (non-singular) 3×3 matrix. For example, the Y, I, Q color coordinate system is defined in terms of R, G, B by the following matrix:

$$\begin{bmatrix} Y \\ I \\ Q \end{bmatrix} = \begin{bmatrix} 0.299 & 0.587 & 0.114 \\ 0.596 & -0.274 & -0.322 \\ 0.211 & -0.523 & 0.312 \end{bmatrix} \begin{bmatrix} R \\ G \\ B \end{bmatrix}$$

Note that not all color spaces are linear. For example, to better model the human visual system, some color conversions attempt to non-linearly re-scale vectors (e.g., logrithmically). Examples are CIE L*u*v* and L*a*b*.

Different color coordinate systems are defined for various reasons. For example, for data to be displayed on monitors, it is convenient for most digital color images to use the R, G, B coordinate system, in fixed range, such as 8 bits per coordinate. If the application requires color decorrelation, such as compression, then R, G, B is far from optimal. Other color coordinates such as Y, I, Q mentioned above are more appropriate. Other color coordinates include YUV and $YC_rC_b$. All of these opponent coordinate systems attempt to provide good luminance and chrominance separation, which is a change in how characters or color appear and how a change in chrominance would appear with the same luminance in related brightness.

For images used for printing, subtractive color systems, such as CYM (cyan, yellow, magenta), are sometimes used. In some applications, over complete 4-dimensional color spaces, such as CMYK (cyan, yellow, magenta, black), are used.

Data compression is an extremely useful tool for storing and transmitting large amounts of data. For example, the time required to transmit an image, such as a facsimile transmission of a document, is reduced drastically when compression is used to decrease the number of bits required to recreate the image.

Many different data compression techniques exist in the prior art. Compression techniques can be divided into two broad categories, lossy coding and lossless coding. Lossy coding involves coding that results in the loss of information, such that there is no guarantee of perfect reconstruction of the original data. The goal of lossy compression is that changes to the original data are done in such a way that they are not objectionable or detectable. In lossless compression, all the information is retained and the data is compressed in a manner which allows for perfect reconstruction.

In lossless compression, input symbols or intensity data are converted to output codewords. The input may include image, audio, one-dimensional (e.g., data changing temporally), two-dimensional (e.g., data changing in two spatial directions), or multi-dimensional/multi-spectral data. If the compression is successful, the codewords are represented in fewer bits than the number of input symbols (or intensity data). Lossless coding methods include dictionary methods of coding (e.g., Lempel-Ziv), run-length encoding, enumerative coding and entropy coding. In lossless image compression, compression is based on predictions or contexts, plus coding. The JBIG standard for facsimile compression and DPCM (differential pulse code modulation—an option in the JPEG standard) for continuous-tone images are examples of lossless compression for images. In lossy compression, input symbols or intensity data are quantized prior to conversion to output codewords. Quantization is intended to preserve relevant characteristics of the data while eliminating less important data. Prior to quantization, lossy compression system often use a transform to provide energy compaction. Baseline JPEG is an example of a lossy coding method for image data.

Traditionally, converting between color coordinates has been used with quantization for lossy compression. In fact, some color spaces, such as CCIR 601-1 ($YC_RB_R$) are intentionally lossy. In some lossless or lossless/lossy systems, the primary requirement is the reversibility and the efficiency of the conversion. In other lossless/lossy systems, in addition to efficiency of the reversible conversion, the color decorrelation may also be a factor. For example, the 3×3 matrix above is only useful for lossy compression since its entries are non-integer and, thus, will add error during repeated compression and decompression when decorrelation is required. Also the application of the 3×3 matrix is not good with respect to lower order bits. That is, the application of the 3×3 matrix requires use of extra bits to obtain necessary precision and to ensure being able to perform the inverse while being able to reconstruct the lower order bits later-these extra bits reduce compression.

When performing color space conversions, numeric precision problems occur. For instance, in a case where eight bits are input, the transform space required is typically 10 or 11 bits, and even higher precision in the internal calculations, just to obtain a stable color space. If a process within sufficient precision is repeatedly applied in which images are converted from an RGB color space and compressed, and decompressed and returned to RGB, the result is an accumulation of errors, such that the original colors and the final colors may not match. This is referred to as color drift or the result of an unstable color space.

The present invention provides color conversion. The color conversion of the present invention is completely reversible and may be used with compression/decompression. Because the color conversion is completely reversible, the present invention may be used as part of a lossless compression/decompression process and system.

SUMMARY OF THE INVENTION

The present invention provides a method and apparatus for performing color conversion on data (e.g., image data). In one embodiment, the present invention provides a system having an input and a color conversion subsystem coupled to the input. The color conversion subsystem performs reversible color conversion on a plurality of vectors. In one embodiment, the color conversion subsystem comprises a forward transform that performs color space conversion that is reversible in integer arithmetic, wherein the transform generates outputs $Y_{rev}$, $U_{rev}$ and $V_{rev}$ according to the equations $$Y_{rev} = G + \left\lfloor \frac{xR + zB + k'}{y} \right\rfloor$$

$$U_{rev} = R - \left\lfloor \frac{yY_{rev} + k}{x + y + z} \right\rfloor$$

$$V_{rev} = B - \left\lfloor \frac{yY_{rev} + k}{x + y + z} \right\rfloor$$

where R, G, and B comprise components in each of the plurality of vectors.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
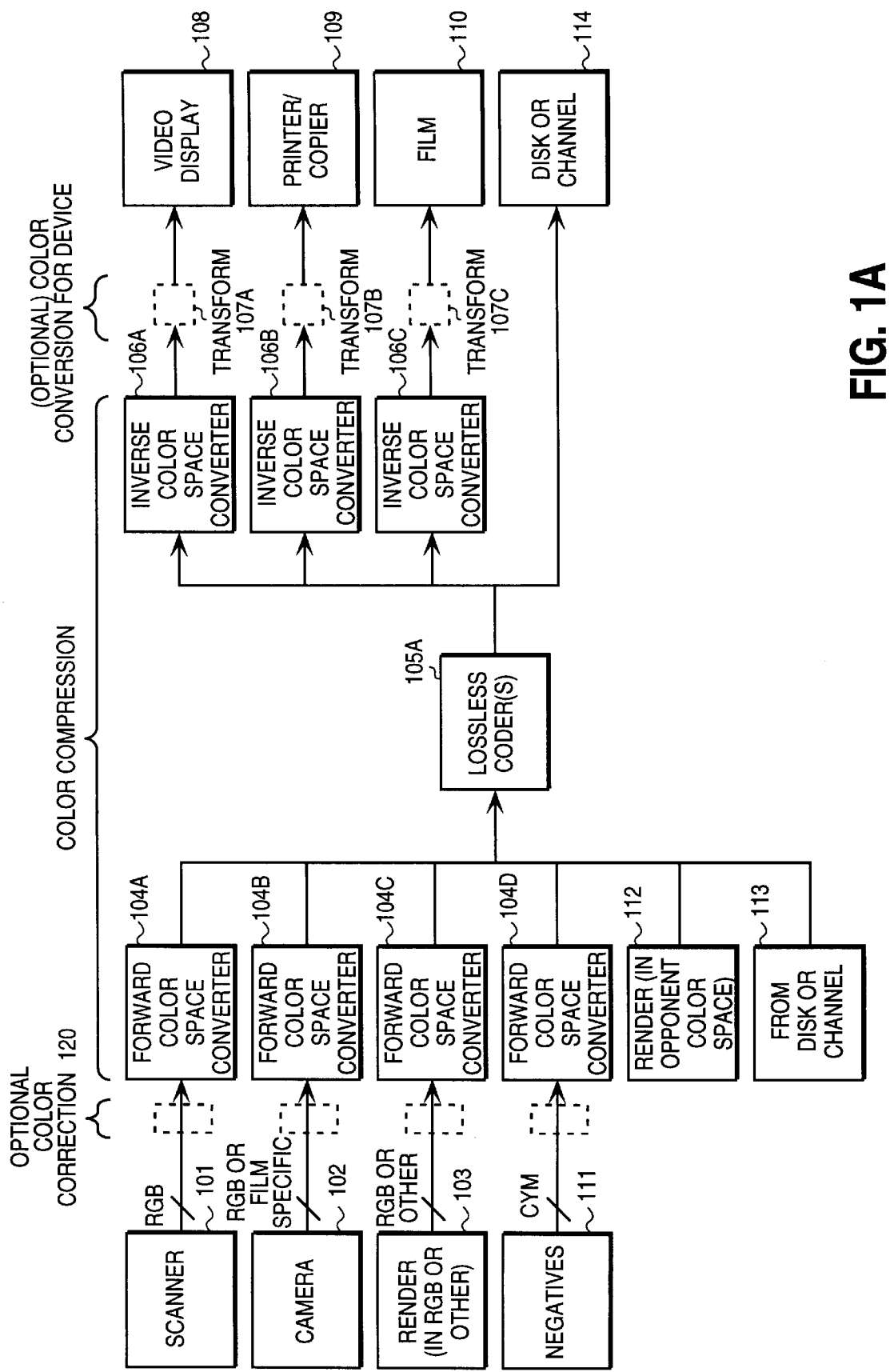
FIG. 1A is a block diagram of the lossless system of the present invention.

A method and apparatus for color conversion is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the System of the Present Invention

FIG. 1 is a block diagram of one embodiment of the system of the present invention. The system of the present invention uses a gamut matching or color conversion subsystem to allow data from one source to be displayed on or processed for a destination device. That is, the system of the present invention provides a visual representation of data in a particular color space or processes data for use by a destination device. Referring to FIG. 1, multiple sources are shown, such as scanner 101, camera 102, rendering data 103 and negatives 111. Each of these sources produces color data. In one embodiment, scanner 101 produces RGB data, while camera 102 produces RGB or film specific color data. Rendering data 103 may be an RGB or another color space. Negatives 111 produces CYM data. Note that although various sources of data are shown, the system may use one, two or more than three sources of data. Each of the sources feeds a color compression system that includes forward color space converters 104A, 104B, 104C, 104D, . . . The system may include less or more forward color space converters.

The system of the present invention transforms the color space data so as to be completely reversible and implementable in integer arithmetic. That is, the color space data that is converted may be reversed to obtain all of the existing data regardless of any rounding or truncation that occurred during the forward conversion process.

Forward color space converters 104A–D convert the data to enable lossless coder(s) 105A to code the data. Note that this coder(s) 105A may represent one or more lossless coders. A forward color space converters 104A–104D convert the color space data into a form that is more easily compressible by lossless coder(s) 105A. In one embodiment, lossless coders may comprise a JPEG's lossless option, JBIG, Lempel Ziv, arithmetic, Huffman, lossless wavelet, etc.

The present invention may also include color data from a rendering (112) directly into the opponent color space or from a disk or channel 113.

Note that lossless coder(s) 105A comprises the encoder and decoder portion to enable compression and thereafter decompression of the color space data that has been converted by forward color space converters 104A–104C. Furthermore, lossless coder(s) 105A may also include the channel or memory arrangement by which data is handled between the encoding and decoding, or the compression and decompression operations, of lossless coder(s) 105A.

The output of lossless coder(s) 105A is coupled to inputs of one or more inverse color space converters 106A, 106B, 106C, . . . The inverse color space converters 106A–106C convert the color space data back to its original form as received by the forward color space converters 104A–104C. In doing so, any rounding or truncation that occurred as part of the forward transform is recovered. Thus, the portion of the system comprising forward color space converters 104A–D, coder(s) 105, and inverse color space converters 106A–106C comprises a color compression subsystem.

The output of the inverse color space converter is 106A–106C may optionally be coupled to transforms 107A, 107B, 107C respectively. Transforms 107A–107C are device specific transforms capable of transforming the data output from the inverse color space converters 106A–106C to device specific color spaces utilized by output devices in the system. That is, transforms 107A–C perform color conversion for the device. This may include gamut matching or other color space or color preference conversion. If the target output device is known prior to color compression, similar optional color correction 120 can be performed prior to forward color space conversion 104.

The output of transform 107A is coupled to a video display 108. The output of transform 107B is coupled to a printer/copier that produces a hard copy visual representation of the data. Transform 107C is coupled to film output 110. As with the input sources, the destination devices may include more or less than those devices shown in FIG. 1A.

It should be noted that such a system may have applications in art archiving, medical images (e.g., angiogram), pre-press, rendered graphics, compression within a color management system (such as Apple's ColorSync™, Kodak's Precious Color™ and EFI's CMS™ system), graphics and spot color, digital imagery for scientific purposes, legal imagery, LANDsat, and remote sensing applications, etc.

Figure 1B:
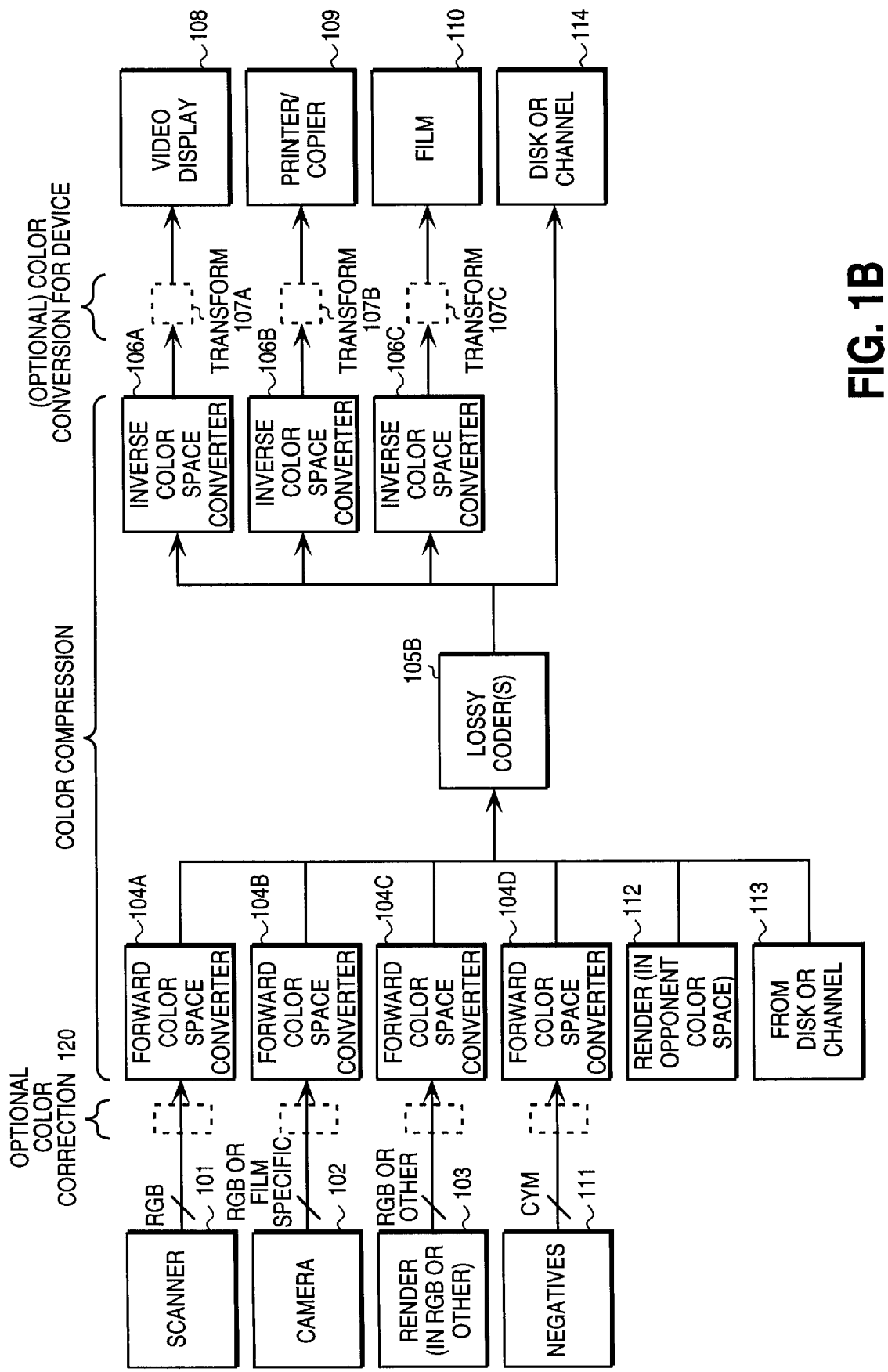
FIG. 1B is a block diagram of the lossy system of the present invention.

FIG. 1B illustrates a lossy system that includes many of the same components as in the lossless system of FIG. 1A with the exception that the lossless coder(s) 105A have been replaced by lossy coder(s) 105B. The operation is the same as the system in FIG. 1A, except for the lossy coding. Such a system has many applications that involve lower cost implementations of digital video, multi-media, digital cameras and JPEG compression systems, vector quantization, fractal compression, wavelet compression, transform compression (e.g., block-based, overlapped).

OVERVIEW OF THE COLOR COMPRESSION SUBSYSTEM OF PRESENT INVENTION

The present invention provides for reversible color conversion. Below, two different transform systems comprising forward and inverse transforms are described that provide reversible color conversion when applied. The transforms are completely reversible in integer arithmetic with predictable precision. That is, any rounding or truncation that occurs during a forward transform is recoverable when performing the inverse transform. Note that the two transform systems described below are not exhaustive and the teachings of the present invention may be applied to many color coordinate systems.

Figure 2:
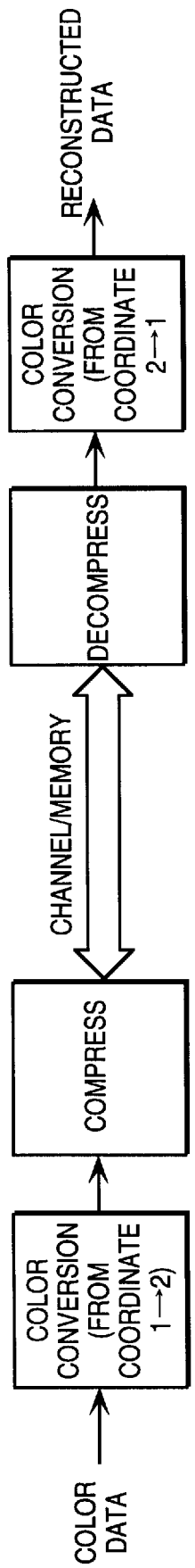
FIG. 2 is a block diagram of one embodiment of the color compression sub-system of the present invention.

As described above, the present invention may be incorporated in a compression and decompression system having an encoding portion and a decoding portion. Such a system is shown in FIG. 2. The encoding portion is responsible for encoding input data to create compressed data, while the decoding portion is responsible for decoding previously encoded data to produce a reconstructed version of the original input data. In the encoding portion prior to compression, color conversion occurs. Similarly, in the decoding portion after decompression, color conversion occurs again.

The input data to the compression and decompression system may comprise a variety of data types, such as image (still or video), graphics data, etc. In one embodiment, the data is digital signal data; however, analog data digitized, and other formats are possible. The source of the data may be a memory or channel for the encoding portion and/or the decoding portion. Such a system incorporating the present invention may comprise a lossless compression/decompression system or may also be configured to perform lossy compression/decompression.

In the present invention, elements of the encoding portion and/or the decoding portion may be implemented in hardware, software, or a combination of the two. In one embodiment, the present invention is implemented as a computer system.

TWO EMBODIMENTS OF THE PRESENT INVENTION

In the following description, the notation of Y, U, V is used for any color coordinates which have U=0, V=0 response on gray scale images defined by R=G=B. If a coordinate is reversible, the notation $Y_{rev}$, $U_{rev}$, $V_{rev}$, is used. Note that the reference to RGB also is not limited to any standard RGB color coordinate system, but refers only to a color coordinate system that is expressed in terms of three coordinates. In non-Red, Green, Blue systems, G is used for the component with the highest information, if any exists.

In one embodiment, the present invention comprises forward and inverse (backward) transforms that provide for reversible color conversion. For explanation purposes, a transform that is not both efficient and reversible is described first. One embodiment of a transform is described below as a 3×3 matrix. The matrix M is based on the color coordinates defined by, $$\begin{bmatrix} Y_r \\ U_r \\ V_r \end{bmatrix} = \begin{bmatrix} 0.25 & 0.5 & 0.25 \\ 1.0 & -1.0 & 0.0 \\ 0.0 & -1.0 & 1.0 \end{bmatrix} \begin{bmatrix} R \\ G \\ B \end{bmatrix}$$

Note that the total of the coefficients in the first row when summed is 1, while the total for the other two rows is 0. The first row sums to 1 and the second and third rows sum to 0 to insure the right response to gray-scale images (as discussed above). Also note that in the present invention, the determinate for the matrix, D(matrix M), equals −1 (i.e., a unit absolute determinant).

Continuing the explanation of the present invention, one implementation of matrix M above is the following equations:

$$Y = \frac{3R + 6G + B}{10}$$
$$U = R - Y$$
$$V = B - G$$

A reversible approximation that comprises one embodiment of a forward transform of the present invention is defined by the following equations $$Y_{rev} = \left\lfloor \frac{3R + 6G + B}{10} \right\rfloor$$
$$U_{rev} = R - Y_{rev}$$
$$V_{rev} = 5Y_{rev} - 2R - 4G + B$$

The notation $\lfloor . \rfloor$ means to round down to the nearest integer or truncate and is sometimes referred to as the floor function. Similarly, the ceiling function $\lceil . \rceil$ means round up to the nearest integer. The reversible equations are approximations because of the $Y_{rev}$ equation includes an integer divide-by-ten operation. Note also that a small random access memory (RAM) or read-only memory (ROM) may be used to perform the floor function described above.

Even though rounding or truncation is used, the above equations represent a reversible color conversion. The following equations prove that the conversion is reversible by constructing the inverse, $$G = Y_{rev} - \left\lfloor \frac{5U_{rev} + V_{rev}}{10} \right\rfloor$$
$$R = Y_{rev} + U_{rev}$$
$$B = V_{rev} + 2R + 4G - 5Y_{rev}$$

A benefit of the above transform is that it provides a better approximation of the luminance perceived by the human visual system. Other benefits of the transform are that it is much more nearly orthogonal and gives a good approximation to the entire RG to YUV space of older standards.

The proof that the equations are reversible follows, starting with a proof of the reversibility of another transform.

The proof seeks to show that the transform defined by (a) $Y_{rev} = \left\lfloor \frac{3R + 6G + B}{10} \right\rfloor$ (b) $U_{rev} = R - G$ (c) $V_{rev} = B - \left\lfloor \frac{R + 2G}{3} \right\rfloor$ implies (d) $G = Y_{rev} - \left\lfloor \frac{10U + 3V_{rev}}{30} \right\rfloor$ (e) $R = U_{rev} + G$ (f) $B = V_{rev} + \left\lfloor \frac{R + 2G}{3} \right\rfloor$ A simple review of the equations indicate that (e) and (f) follow trivially from (b) and (c). Therefore, the remainder of the proof remains only to show $$G = \left\lfloor \frac{3R + 6G + B}{10} \right\rfloor - \left\lfloor \frac{10R + 10G + 3B * \left\lfloor \frac{R + 2G}{3} \right\rfloor}{30} \right\rfloor$$

The general identity $$G = \left\lfloor \frac{X + AG}{A + B} \right\rfloor - \left\lfloor \frac{X - BG}{A + B} \right\rfloor$$

may be applied to the above equation to produce $$G = \left\lfloor \frac{3R + B + 6G}{10} \right\rfloor - \left\lfloor \frac{9R + 3B - 12G + M}{30} \right\rfloor$$

Since R, G, B are integers, the value M, where $0 <= +(M/3) < 1$, can be added to the rightmost numerator. Multiplying that fraction by 3/3 gives, for any $0 <= M < 3$, $$G = \left\lfloor \frac{3R + B + 6G}{10} \right\rfloor - \left\lfloor \frac{9R + 3B - 12G + M}{30} \right\rfloor$$

Observe that $$R + 2G = 3 * \left\lfloor \frac{R + 2G}{3} \right\rfloor + M$$

where $0 <= M < 3$ is the modular 3 residue of $(R + 2G)$. Substituting results in the equation:

$$G = \left\lfloor \frac{3R + B + 6G}{10} \right\rfloor - \left\lfloor \frac{9R + 3B - 12G + R + 2G - 3 * \left\lfloor \frac{R + 2G}{3} \right\rfloor}{30} \right\rfloor$$

which when substituting is performed produces the G equation above.

To establish the validity of the transform of the present invention, it must be shown that (a) $Y_{rev} = \left\lfloor \frac{3R + 6G + B}{10} \right\rfloor$ (b) $U_{rev} = R - Y_{rev}$ (c) $V_{rev} = 5Y_{rev} - 2R - 4G + B$ implies (d) $R = Y_{rev} + U_{rev}$ (e) $G + Y_{rev} - \left\lfloor \frac{5U_{rev} + V_{rev}}{10} \right\rfloor$ (f) $B = V_{rev} + 2R + 4G - 5Y_{rev}$ Again (d) and (f) are trivial; therefore, the remainder of the proof focuses on:

$$G = \left\lfloor \frac{3R + 6G + B}{10} \right\rfloor - \left\lfloor \frac{5R - 5Y_{rev} + 5Y_{rev} - 2R - 4G + B}{10} \right\rfloor$$

or simply $$G = \left\lfloor \frac{3R + 6G + B}{10} \right\rfloor - \left\lfloor \frac{3R - 4G + B}{10} \right\rfloor$$

This has the form of the general identity described above $$G = \left\lfloor \frac{X + AG}{A + B} \right\rfloor - \left\lfloor \frac{X - BG}{A + B} \right\rfloor$$

Therefore, because the previous transform with the identity proved to be reversible, the transform of the present invention is reversible.

An alternative embodiment is as follows:

$$Y = \frac{3R + 6G + B}{10}$$
$$U = R - G$$
$$V = B - G$$

A reversible approximation that comprises an embodiment of a forward transform of the alternative embodiment is given by:

$$Y_{rev} = \left\lfloor \frac{3R + 6G + B}{10} \right\rfloor$$
$$U_{rev} = R - G$$
$$V_{rev} = B - G$$

The reverse is as follows:

$$G = Y_{rev} - \left\lfloor \frac{3U_{rev} + V_{rev}}{10} \right\rfloor$$
$$R = U_{rev} + G$$
$$B = V_{rev} + G$$

In an alternate embodiment, the present invention provides another reversible transform as follows:

$$Y_{rev} = G + \left\lfloor \frac{3R + B}{6} \right\rfloor$$
$$U_{rev} = R - \left\lfloor \frac{3Y_{rev} + 2}{5} \right\rfloor$$
$$V_{rev} = B - \left\lfloor \frac{3Y_{rev} + 2}{5} \right\rfloor$$

$$R = U_{rev} + \left\lfloor \frac{3Y_{rev} + 2}{5} \right\rfloor$$
$$B = V_{rev} + \left\lfloor \frac{3Y_{rev} + 2}{5} \right\rfloor$$
$$G = Y_{rev} - \left\lfloor \frac{3R + B}{6} \right\rfloor$$

This implementation provides a number of advantages over other transforms described above. First, chrominance $U_{rev}$ and $Y_{rev}$ now share the same scale. Also, the transform provides more precision of luminance. Moreover, the perfect gray has chrominance of exactly zero.

A disadvantage appears to be an extra table lookup. That is, both coding and decoding require one division by 5 and one division by 6. The common quotients by 5 may be reused.

The rational transform in matrix form, shown multiplied by its inverse:

$$\begin{vmatrix} +0.6 & +1.0 & 0 \\ +0.6 & -0.5 & -1/6 \\ +0.6 & 0 & +1.0 \end{vmatrix} \begin{vmatrix} +0.5 & +1.0 & +1/6 \\ +0.7 & -0.6 & -0.1 \\ -0.3 & -0.6 & +0.9 \end{vmatrix} = \text{Identity}$$

The present invention may be set forth generally as follows:

$$Y_{rev} = G + \left\lfloor \frac{xR + zB + k'}{y} \right\rfloor$$
$$U_{rev} = R - \left\lfloor \frac{yY_{rev} + k}{x + y + z} \right\rfloor$$
$$V_{rev} = B - \left\lfloor \frac{yY_{rev} + k}{x + y + z} \right\rfloor$$

$$R = U_{rev} + \left\lfloor \frac{yY_{rev} + k}{x + y + z} \right\rfloor$$
$$B = V_{rev} + \left\lfloor \frac{yY_{rev} + k}{x + y + z} \right\rfloor$$
$$G = Y_{rev} - \left\lfloor \frac{xR + zB + k'}{y} \right\rfloor$$

This transform has the desired properties for any values of (x, y, z, k, k'). The weights (x, y, z) are the luminance weights of red, green and blue. The k, k' values help determine what is rounded off with the floor functions. One of k or k' is zero for simplicity and the other set via $$k + k' \approx y - \frac{1 + (x + z)}{2}$$

to provide the most exact luminance/chrominance separation given these equations above.

As described above, one implementation of the general force is (x,y,z)=(3,6,1). Using (x,y,z)=(299,587,114) gives the standard YUV. In alternate embodiments, either (5,10,2) or (2,4,1) may be used. The former offers an excellent approximation to the standard values.

With (2,4,1), blue is given a more equal luminance weight. This is slightly inferior in an application pairing daylight with the human retina, but for other applications (2,4,1) is better and thus overall more robust. In particular note that blue makes a much bigger contribution to the luminance of color CRT monitors than it does in daylight but the standard RGB equations assume daylight.

In the case of (x,y,z)=(2,4,1), the following transform results:

$$Y_{rev} = G + \left\lfloor \frac{2R+B}{4} \right\rfloor$$

$$U_{rev} = R - \left\lfloor \frac{4Y_{rev}+4}{7} \right\rfloor$$

$$V_{rev} = B - \left\lfloor \frac{4Y_{rev}+4}{7} \right\rfloor$$

$$R = U_{rev} + \left\lfloor \frac{4Y_{rev}+4}{7} \right\rfloor$$

$$B = V_{rev} + \left\lfloor \frac{4Y_{rev}+4}{7} \right\rfloor$$

$$G = Y_{rev} - \left\lfloor \frac{2R+B}{4} \right\rfloor$$

FORWARD AND REVERSE TRANSFORMS OF THE PRESENT INVENTION

Figure 3A:
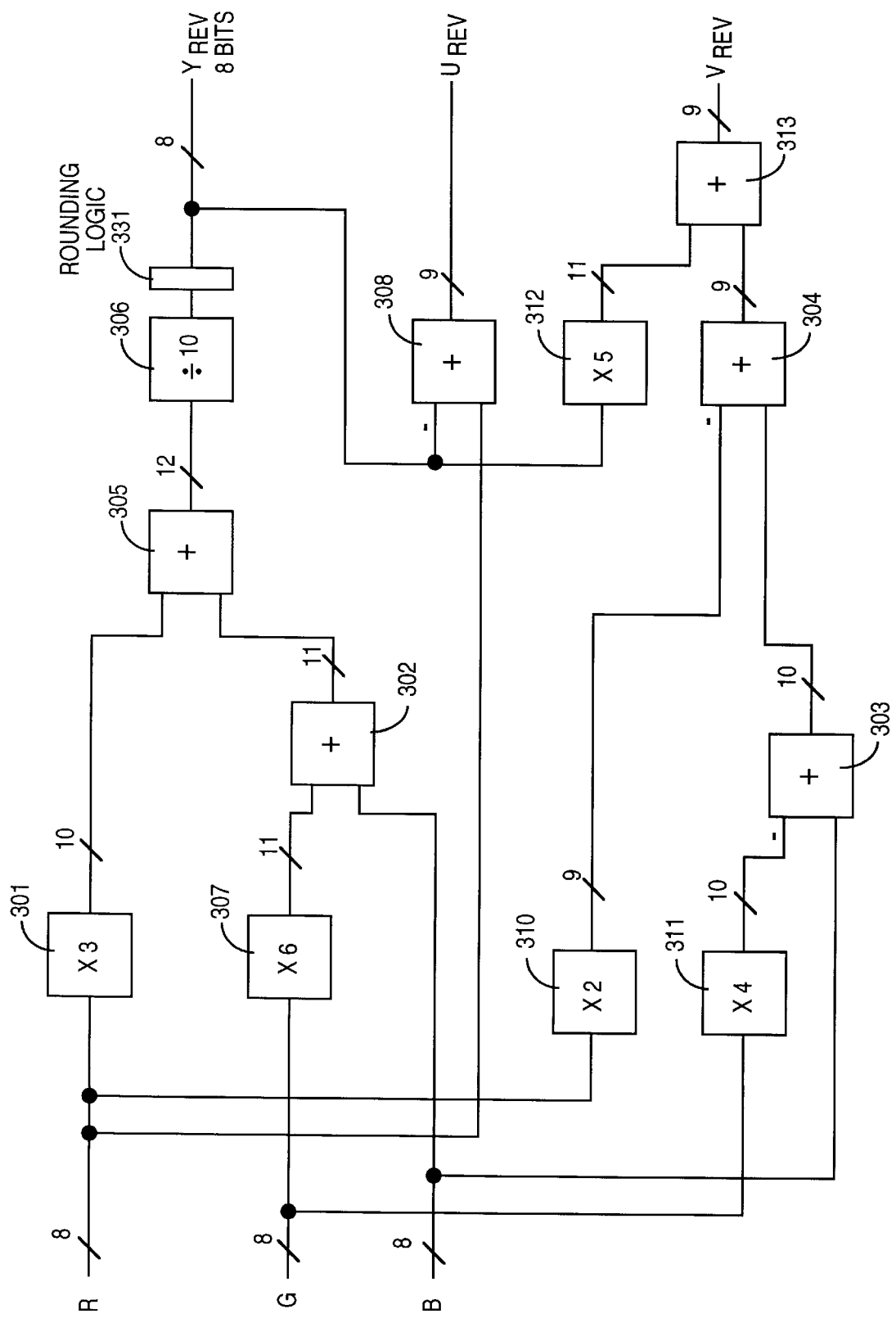
FIG. 3A is one embodiment of a forward transform of the present invention.

FIG. 3A is a block diagram of one embodiment of the forward transform of the first embodiment described above. The forward transform shown in FIG. 3A may be part of a compression scheme in which data from a first color space is converted to a second color space prior to compression being applied to the data. This may be done when better compression may be achieved with the data in a second color space.

Referring to FIG. 3A, the forward transform 300 has three inputs, R, G, and B, and produces three outputs, $Y_{rev}$, $U_{rev}$, and $V_{rev}$. In the embodiment shown, each of the R, G and B inputs is 8 bits in length. Note that the present invention may be configured for inputs of other bit lengths (e.g., 10, 11 . . . 32, . . . ). When the RGB inputs are eight bits, the $Y_{rev}$ output is eight bits and the $U_{rev}$ and $V_{rev}$ outputs are nine bits in length.

Transform 300 comprises a multiply-by-three block 301, adders 302, 305, 308, and 313, subtractors 303 and 304, divide-by-ten 306, multiply-by-six block 307, multiply-by-two block 310, multiply-by-four block 311 and multiply-by-five block 312. In one embodiment, the multiplications and divisions are implemented as hardwired shifts to reduce hardware cost.

Multiply-by-three block 301 multiplies the R input by three. In one embodiment, multiply-by-three block 301 comprises shifting logic to shift the input one bit position to the left and an adder that adds the output of the shifting logic to the R input, where the output of the adder is the result of the multiply-by-three operation. The result of the multiply operation is sent to one input of adder 305.

Multiply-by-six block 307 multiplies the G input by six. In one embodiment, multiply-by-six block 307 comprises a pair of shifters and an adder. One of the shifters performs a multiply-by-four operation on the G input by shifting the G input to the left two bit positions. The other shifter performs a multiply-by-two operation on the G input by shifting the G input to the left one bit position. The resultant outputs are added together by the adder, the output of which is the result of multiply-by-six block 307. In an alternative embodiment, multiply-by-six block 307 comprises a pair of shifters and an adder. The first shifter performs a multiply-by-two operation by shifting the G input by one to he left. The result output from the shifter is added to the G input by the adder. The output of the adder is input to the second shifter, which performs a multiply-by-two operation by shifting its input by one to the left. The output of the second shifter is the output of multiply-by-six 307.

Adder 302 adds the output of multiply-by-six block 307 to the B input. The output of adder 302 is added to the output of multiply-by-three block 301 using adder 305. The output of adder 305 is coupled to the input of divide-by-ten block 306.

Divide-by-ten block 306 divides the (n+2)-bit input by ten. Divide-by-ten block 306 may comprise a fully specified lookup table with every mathematical function specified. In one embodiment, the lookup table comprises 4096 values for a 12 bit input. In an alternative embodiment, a smaller lookup table may be used in a long division manner. In still another embodiment, the division is performed by converting the binary number to a binary coded decimal (BCD) number, truncating the lowest nibble, and then converting the result of the truncation back to binary.

The output of divide-by-ten block 306 is input to rounding logic 331 that performs the appropriate rounding. The output of rounding logic 301 comprises the $Y_{rev}$ output of forward transform 300.

The output of divide-by-ten block 306 is also subtracted form the R input using adder 308 to produce the $U_{rev}$ output.

Multiply-by-two block 310 multiplies the R input by two. In one embodiment, multiply-by-two block 310 comprises shifting logic to shift the R input to the left by one. Multiply-by-four block 311 multiplies the G input by four. In one embodiment, multiply-by-four block 311 comprises shifting logic to shift the G input to the left by two bit positions. Subtractor 303 subtracts the output of multiply-by-four block 311 from the B input. Subtractor 30 4 subtracts the output of multiply-by-two block 310 from the output of subtractor 303.

Multiply-by-five block 312 multiplies the $Y_{rev}$ output of rounding logic 331 by five. In one embodiment, multiply-by-five block 312 comprises shifting logic to shift the output of the rounding logic 331 to the left two bit positions and adding the result of the shifting operation to the output of rounding logic 331 with an adder. Adder 313 adds the output of multiply-by-five block 312 to the output of subtractor 304 to produce the $V_{rev}$ output.

The $Y_{rev}$, $U_{rev}$ and $V_{rev}$ outputs generated with forward transform 300 may be forwarded to a system or mechanism to undergo compression in a lossless or lossy system. Since 3×n bits of input results in 3×n+2 bits of output, a reversible transform in integer arithmetic with predictable precision is provided.

Figure 3B:
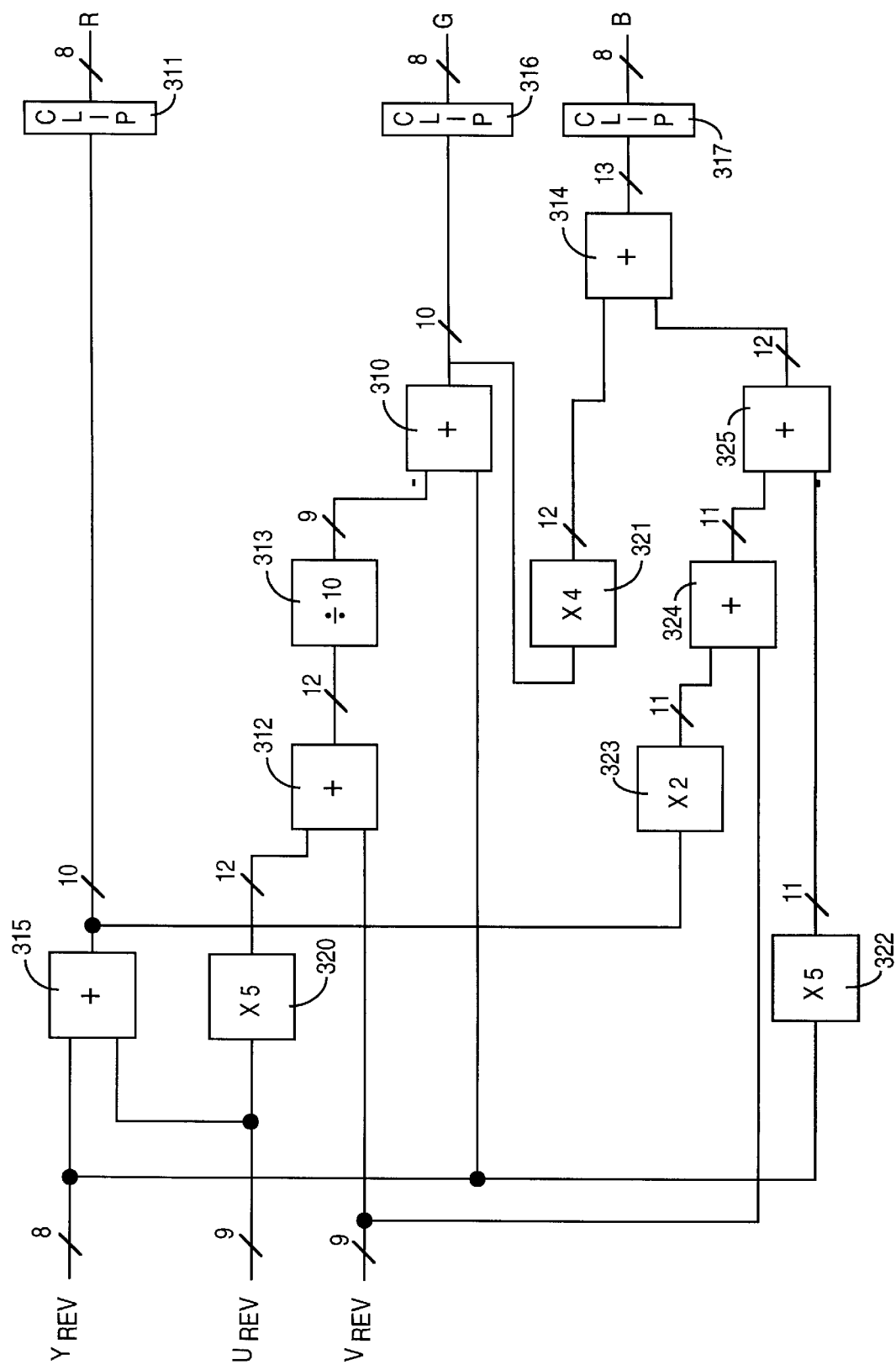
FIG. 3B is one embodiment of a portion of an inverse transform used to recover the components of a color coordinate system according to the present invention.

FIG. 3B illustrates one embodiment of the inverse transform of the first embodiment of the present invention described above. The inverse color transform 320 recovers the G, R and B components.

Referring to FIG. 3B, the inverse color transform 320 comprises adders 312, 314, 315 and 324, divide-by-ten block 313, multiply-by-five block 321, multiply-by-two block 323, multiply-by-five block 322, subtractors 310 and 325 and clipping logic 311, 316 and 317. The inverse transform 320 is coupled to receive the $Y_{rev}$, $U_{rev}$ and $V_{rev}$ inputs and produces the G, R and B components. In one embodiment the $Y_{rev}$, $U_{rev}$ and $V_{rev}$ components comprise n bits, n+1 bits and n+1 bits respectively. In one embodiment, n=8.

Multiply-by-five block 320 multiplies the $U_{rev}$ by five. In one embodiment, multiply-by-five block 320 comprises shifting logic and an adder as described above. Adder 312 adds the output of multiply-by-five block 320 and $V_{rev}$ inputs. The output is divided by ten by divide-by-ten block 313. In one embodiment, the divide-by-ten 313 is implemented as described above. The output of divide-by-ten 313 is subtracted from the $Y_{rev}$ input using subtractor 310.

The output of subtractor 310 is input to clipping logic 311. In one embodiment, clipping logic 311 performs addition or subtraction to force the number into a range (e.g., 256), thereby producing an n-bit G component as an output of inverse transform 320. For instance, when clipping for 8 bits, if the input is less than 0, then the output is 0; otherwise, if the input is greater than 255, then the output is 235; otherwise, the output is equal to the input.

Adder 315 adds the $U_{rev}$ input to the $Y_{rev}$ input. Clipping logic 311 forces the number into the desired range, thereby producing an n-bit number representing the R component that is output from the inverse transform 320.

Multiply-by-five 322 multiplies the $Y_{rev}$ input by five. In one embodiment, multiply-by-five block 322 is implemented as described above. Multiply-by-two block 323 multiplies the output of adder 315 by two. In one embodiment, multiply-by-two block 323 comprises shifting logic to shift its input to the left one bit position. Adder 324 adds the output of multiply-by-two block 323 to the $V_{rev}$ input. The output of multiply-by-five block 322 is subtracted from the output of adder 324 using subtractor 325. The output of subtractor 310 is multiplied by four by multiply-by-four block 321. In one embodiment, multiply-by-four block 321 comprises shifting logic to shift its input to the left by two bit positions. Adder 314 adds the $V_{rev}$ input to the output of subtractor 320. The output of adder 314 is input to clipping logic 317. Clipping logic 317 produces an n-bit number representing the B component output of inverse transform 320.

Note in the above inverse transform, if the system employing the color conversion is a lossless compression system, clipping logic is not necessary since the output of the adders will be n-bits in length. However, if the $Y_{rev}$, $U_{rev}$ and $V_{rev}$ inputs have been created and have been subjected to quantization during processing, then clipping logic is necessary to ensure that the output is in the correct range (e.g., the correct number of bits).

The other transforms described above may be implemented in a similar manner.

Although the above color conversion process has been described with reference to three vectors, the techniques of the present invention may be applied to color conversions involving other numbers of vectors (e.g., 4, 5, etc.). Likewise, the present invention may be applied to non-color vectors where a conversion process is utilized.

Thus, the present invention provides for reversible color conversion implemented in integer arithmetic with predictable results.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, an apparatus and method for reversible color conversion has been described.

We claim:
1. A system comprising:
an input; and
a color conversion subsystem coupled to the input to perform reversible color conversion on a plurality of vectors of color data, wherein the color conversion subsystem comprises
a forward transform that performs color space conversion that is reversible in integer arithmetic, wherein the transform generates outputs $Y_{rev}$, $U_{rev}$ and $V_{rev}$ according to the following equations

$$Y_{rev} = \left\lfloor \frac{3R + 6G + B}{10} \right\rfloor$$

$$U_{rev} = R - Y_{rev}$$

$$V_{rev} = 5Y_{rev} - 2R - 4G + B$$

where R, G and B comprise components in each of the plurality of vectors, and
at least one coder to code output results of the forward transform.

2. The system defined in claim 1 further comprising at least one destination device coupled to the color conversion subsystem for manipulating the plurality of vectors after reconversion by said color conversion system.

3. The system defined in claim 1 further comprising at least one source of the plurality of vectors of color data coupled to the input.

4. The system defined in claim 1 wherein the color conversion system is operable to recover any rounding or truncation that occurs during color conversion.

5. The system defined in claim 1 further comprising an inverse transform.

6. A system comprising:
an input; and
a color conversion subsystem coupled to the input to perform reversible color conversion on a plurality of vectors of color data, wherein the color conversion subsystem comprises
at least one coder to operate on data from the inputs and
an inverse transform coupled to the input to regenerate the plurality of vectors from outputs Yrev, Urev and Vrev from the at least one coder according to the following equations $$G = Y_{rev} - \left\lfloor \frac{5U_{rev} + V_{rev}}{10} \right\rfloor$$

$$R = U_{rev} + Y_{rev}$$

$$B = V_{rev} + 2R + 4G - 5Y_{rev}$$

where R, G and B comprise components of the plurality of vectors.

7. The system defined in claim 6 further comprising at least one destination device coupled to the color conversion subsystem for manipulating the plurality of vectors after reconversion by said color conversion system.

8. The system defined in claim 6 further comprising at least one source of the plurality of vectors of color data coupled to the input, and wherein the color conversion subsystem further comprises a forward transform that performs color space conversion that is reversible in integer arithmetic.

9. A method for performing color conversion comprising:
forward transforming a plurality of vectors from a first color space to a second color space using integer arithmetic, wherein forward transforming comprises generating outputs Yrev, Urev and Vrev according to the following equations $$Y_{rev} = \left\lfloor \frac{3R + 6G + B}{10} \right\rfloor$$

$$U_{rev} = R - Y_{rev}$$

$$V_{rev} = 5Y_{rev} - 2R - 4G + B$$

where R, G and B comprise components in each of the plurality of vectors;

coding outputs Yrev, Urev and Vrev;

decoding coded outputs Yrev, Urev and Vrev; and inverse transforming the plurality of vectors in the second color space to the first color space using integer arithmetic, wherein any truncation and rounding performed during the color conversion are recovered.

10. A method for performing color conversion comprising:

forward transforming a plurality of vectors from a first color space to a second color space using integer arithmetic;

coding the plurality of vectors after transformation;

decoding coded vectors to recover the plurality of vectors; and inverse transforming the plurality of vectors in the second color space to the first color space using integer arithmetic, wherein any truncation and rounding performed during the color conversion are recovered, wherein inverse transforming comprises regenerating the plurality of vectors from outputs Yrev, Urev and Vrev according to the following equations $$G = Y_{rev} - \left\lfloor \frac{5U_{rev} + V_{rev}}{10} \right\rfloor$$

$$R = U_{rev} + Y_{rev}$$

$$B = V_{rev} + 2R + 4G - 5Y_{rev}$$

where R, G and B comprise components in each of the plurality of vectors.

11. A system comprising:

an input; and a color conversion subsystem coupled to the input to perform reversible color conversion on a plurality of vectors of color data, wherein the color conversion subsystem comprises a forward transform that performs color space conversion that is reversible in integer arithmetic, wherein the transform generates outputs $Y_{rev}$, $U_{rev}$ and $V_{rev}$ according to the following equations $$Y_{rev} = \left\lfloor \frac{3R + 6G + B}{4} \right\rfloor$$

$$U_{rev} = R - G$$

$$V_{rev} = B - G$$

where R, G and B comprise components in each of the plurality of vectors; and at least one coder to code output results of the forward transform.

12. The system defined in claim 11 further comprising at least one destination device coupled to the color conversion subsystem for manipulating the plurality of vectors after reconversion by said color conversion system.

13. The system defined in claim 11 further comprising at least one source of the plurality of vectors of color data coupled to the input.

14. The system defined in claim 11 further comprising an inverse transform.

15. A method for performing color conversion comprising:

forward transforming a plurality of vectors from a first color space to a second color space using integer arithmetic, wherein forward transforming comprises generating outputs Yrev, Urev and Vrev according to the following equations $$Y_{rev} = \left\lfloor \frac{3R + 6G + B}{4} \right\rfloor$$

$$U_{rev} = R - G$$

$$V_{rev} = B - G$$

where R, G and B comprise components in each of the plurality of vectors;

coding outputs Yrev, Urev and Vrev;

decoding coded outputs Yrev, Urev and Vrev; and inverse transforming the plurality of vectors in the second color space to the first color space using integer arithmetic, wherein any truncation and rounding performed during the color conversion are recovered.

16. A system comprising:

a color conversion subsystem to reverse a reversible color conversion performed on a plurality of vectors, wherein the color conversion subsystem comprises an inverse transform to regenerate the plurality of vectors from outputs $Y_{rev}$, $U_{rev}$ and $V_{rev}$ using integer arithmetic according to the following equations $$G = Y_{rev} - \left\lfloor \frac{U_{rev} + V_{rev}}{10} \right\rfloor$$

$$R = U_{rev} + G$$

$$B = V_{rev} + G$$

where R, G and B comprise components of the plurality of vectors; and at least one destination device coupled to the color conversion subsystem for manipulating the plurality of vectors after reconversion by said color conversion system.

17. A system comprising:

an input; and a color conversion subsystem coupled to the input to perform reversible color conversion on a plurality of vectors of color data, wherein the color conversion subsystem comprises a forward transform that performs color space conversion that is reversible in integer arithmetic, wherein the transform generates outputs $Y_{rev}$, $U_{rev}$ and $V_{rev}$ according to the following equations $$Y_{rev} = G + \left\lfloor \frac{3R + B}{6} \right\rfloor$$

-continued $$U_{rev} = R - \left\lfloor \frac{3Y_{rev} + 2}{5} \right\rfloor$$

$$V_{rev} = B - \left\lfloor \frac{3Y_{rev} + 2}{5} \right\rfloor$$

where R, G and B comprise components in each of the plurality of vectors; and at least one coder to code output results of the forward transform.

18. The system defined in claim 17 further comprising at least one destination device coupled to the color conversion subsystem for manipulating the plurality of vectors after reconversion by said color conversion system.

19. The system defined in claim 17 further comprising at least one source of a plurality of vectors of color data coupled to the input.

20. The system defined in claim 17 wherein the color conversion system is operable to recover any rounding or truncation that occurs during color conversion.

21. The system defined in claim 17 further comprising an inverse transform.

22. A system comprising:

an input; and a color conversion subsystem coupled to the input to perform reversible color conversion on a plurality of vectors of color data, wherein the color conversion subsystem comprises at least one coder to operate on data from the output; and an inverse transform coupled to the input to regenerate the plurality of vectors from outputs Yrev, Urev and Vrev from the at least one coder according to the following equations $$R = U_{rev} + \left\lfloor \frac{3Y_{rev} + 2}{5} \right\rfloor$$

$$B = V_{rev} + \left\lfloor \frac{3Y_{rev} + 2}{5} \right\rfloor$$

$$G = Y_{rev} - \left\lfloor \frac{3R + B}{6} \right\rfloor$$

where R, G and B comprise components of the plurality of vectors.

23. The system defined in claim 22 further comprising at least one destination device coupled to the color conversion subsystem for manipulating the plurality of vectors after reconversion by said color conversion system.

24. The system defined in claim 22 further comprising at least one source of the plurality of vectors of color data coupled to the input, and wherein the color conversion subsystem further comprises a forward transform that performs color space conversion that is reversible in integer arithmetic.

25. A method for performing color conversion comprising:

forward transforming a plurality of vectors from a first color space to a second color space using integer arithmetic, wherein forward transforming comprises generating outputs $Y_{rev}$, $U_{rev}$ and $V_{rev}$ according to the following equations:

$$Y_{rev} = G + \left\lfloor \frac{3R + B}{6} \right\rfloor$$

$$U_{rev} = R - \left\lfloor \frac{3Y_{rev} + 2}{5} \right\rfloor$$

$$V_{rev} = B - \left\lfloor \frac{3Y_{rev} + 2}{5} \right\rfloor$$

where R, G and B comprise components in each of the plurality of vectors;

coding outputs Yrev, Urev and Vrev;

decoding coded outputs Yrev, Urev and Vrev; and inverse transforming the plurality of vectors in the second color space to the first color space using integer arithmetic, wherein any truncation and rounding performed during the color conversion are recovered.

26. A method for performing color conversion comprising:

forward transforming a plurality of vectors from a first color space to a second color space using integer arithmetic;

coding the plurality of vectors after transformation; and inverse transforming the plurality of vectors in the second color space to the first color space using integer arithmetic, wherein any truncation and rounding performed during the color conversion are recovered, wherein inverse transforming comprises regenerating the plurality of vectors from outputs $Y_{rev}$, $U_{rev}$ and $V_{rev}$ according to the following equations:

$$R = U_{rev} + \left\lfloor \frac{3Y_{rev} + 2}{5} \right\rfloor$$

$$B = V_{rev} + \left\lfloor \frac{3Y_{rev} + 2}{5} \right\rfloor$$

$$G = Y_{rev} - \left\lfloor \frac{3R + B}{6} \right\rfloor$$

where R, G and B comprise components in each of the plurality of vectors.

27. A system comprising:

an input; and a color conversion subsystem coupled to the input to perform reversible color conversion on a plurality of vectors, wherein the color conversion subsystem comprises a forward transform that performs color space conversion that is reversible in integer arithmetic, wherein the transform generates outputs $Y_{rev}$, $U_{rev}$ and $V_{rev}$ according to the following equations $$Y_{rev} = G + \left\lfloor \frac{xR + zB + k'}{y} \right\rfloor$$

$$U_{rev} = R - \left\lfloor \frac{yY_{rev} + k}{x + y + z} \right\rfloor$$

$$V_{rev} = B - \left\lfloor \frac{yY_{rev} + k}{x + y + z} \right\rfloor$$

where R, G and B comprise components in each of the plurality of vectors and at least one coder to code output results of the forward transform.

28. A system comprising:

an input; and a color conversion subsystem coupled to the input to perform reversible color conversion on a plurality of vectors, wherein the color conversion subsystem comprises:

at least one coder to operate on data from the output; and an inverse transform coupled to the input to regenerate the plurality of vectors from outputs $Y_{rev}$, $U_{rev}$ and $V_{rev}$ from the at least one coder according to the following equations:

$$R = U_{rev} + \left\lfloor \frac{yY_{rev} + k}{x + y + z} \right\rfloor$$

$$B = V_{rev} + \left\lfloor \frac{yY_{rev} + k}{x + y + z} \right\rfloor$$

$$G = Y_{rev} - \left\lfloor \frac{xR + zB + k'}{y} \right\rfloor$$

where R, G and B comprise components of the plurality of vectors.

29. An article of manufacture having at least one recordable medium having executable instructions stored thereon which, when executed by a processing device, cause the processing device to:

receive a plurality of vectors of color data; and perform reversible color conversion on the plurality of vectors of color data by performing a forward transform on the plurality of vectors that results in a color space conversion that is reversible in integer arithmetic, wherein performing the forward transform comprises generating outputs $Y_{rev}$, $U_{rev}$ and $V_{rev}$ according to the following equations $$Y_{rev} = \left\lfloor \frac{3R + 6G + B}{10} \right\rfloor$$

$$U_{rev} = R - Y_{rev}$$

$$V_{rev} = 5Y_{rev} - 2R - 4G + B$$

where R, G and B comprise components in each of the plurality of vectors, and coding output results of the forward transform.

30. An article of manufacture having at least one recordable medium having executable instructions stored thereon which, when executed by a processing device, cause the processing device to:

receive a plurality of vectors of color data;

reverse a reversible color conversion on the plurality of vectors of color data by decoding data, and performing an inverse transform to regenerate the plurality of vectors from outputs Yrev, Urev and Vrev according to the following equations $$G = Y_{rev} - \left\lfloor \frac{5U_{rev} + V_{rev}}{10} \right\rfloor$$

$$R = U_{rev} + Y_{rev}$$

$$B = V_{rev} + 2R + 4G - 5Y_{rev}$$

where R, G and B comprise components of the plurality of vectors.

31. An article of manufacture having at least one recordable medium having executable instructions stored thereon which, when executed by a processing device, cause the processing device to:

receive a plurality of vectors of color data;

perform a reversible color conversion on the plurality of vectors of color data by performing a forward transform to create a color space conversion that is reversible in integer arithmetic, wherein performing the forward transform comprising generating outputs $Y_{rev}$, $U_{rev}$ and $V_{rev}$ according to the following equations $$Y_{rev} = \left\lfloor \frac{3R + 6G + B}{4} \right\rfloor$$

$$U_{rev} = R - G$$

$$V_{rev} = B - G$$

where R, G and B comprise components in each of the plurality of vectors, and coding output results of the forward transform.

32. An article of manufacture having at least one recordable medium having executable instructions stored thereon which, when executed by a processing device, cause the processing device to:

receive a plurality of vectors of color data;

reverse a reversible color conversion performed on the plurality of vectors by decoding data, and performing an inverse transform to regenerate the plurality of vectors from outputs $Y_{rev}$, $U_{rev}$ and $V_{rev}$ using integer arithmetic according to the following equations $$G = Y_{rev} - \left\lfloor \frac{U_{rev} + V_{rev}}{10} \right\rfloor$$

$$R = U_{rev} + G$$

$$B = V_{rev} + G$$

where R, G and B comprise components of the plurality of vectors; and manipulating the plurality of vectors after reconversion.

* * * * *